United States Patent [19]

Stephens

[11] Patent Number: 4,574,811
[45] Date of Patent: Mar. 11, 1986

[54] PRESSURE DOME

[75] Inventor: Thomas P. Stephens, Boxford, Mass.

[73] Assignee: Hewlett-Packard Company, Palo Alto, Calif.

[21] Appl. No.: 591,724

[22] Filed: Mar. 21, 1984

[51] Int. Cl.$^4$ .............................................. A61B 5/02
[52] U.S. Cl. .................................. 128/675; 128/748; 73/723
[58] Field of Search .............................. 128/672–673, 128/675, 748; 73/714–715, 723–728, 756

[56] References Cited

U.S. PATENT DOCUMENTS 4,185,641 1/1980 Minior et al. .................. 128/748 X
4,398,542 8/1983 Cunningham et al. ......... 128/748 X Primary Examiner—Lee S. Cohen
Assistant Examiner—Angela D. Sykes
Attorney, Agent, or Firm—Donald N. Timbie

[57] ABSTRACT

A pressure dome that is attached to a transducer housing by springs is provided with means for limiting the amount by which the springs can be flexed so as to prevent them from being damaged. The springs are of the beam type and projections extending from them engage stops on the body of the dome so as to limit their movement.

4 Claims, 6 Drawing Figures

PRESSURE DOME

BACKGROUND OF THE INVENTION

This invention relates to improvements in pressure domes used for coupling the blood pressure of a patient to a transducer that generates an electrical signal corresponding to the pressure. The domes are generally comprised of a body portion having ports extending therethrough so as to communicate with a cavity therein and a membrane that closes the open side of the cavity. Generally but not necessarily, the edge of the cavity to which the membrane is attached is circular. Use of the dome involves connecting a valve to a first port and connecting another valve between the second port and one end of a catheter. Both valves are opened and a suitable fluid is passed through the first port until both the cavity and the catheter are filled. The valve connected to the first port is then closed and the open end of the catheter is pushed through the arterial system until it reaches the point therein at which the pressure is to be measured. The dome is then attached to a pressure transducer in such manner that its membrane is brought into intimate contact with the pressure sensing surface of the transducer. With such an arrangement, the pressure in the blood at the open end of the catheter is conveyed via the fluid in the catheter and in the cavity to one side of the membrane and presses the other side of the membrane against the pressure sensing surface of the transducer so as to cause it to produce an electrical signal corresponding to the pressure.

Whereas the membrane of a pressure dome may be placed in contact with the pressure sensing surface of a transducer by screwing the dome and the transducer together, it was found that the contact pressure between the membrane and the pressure sensing surface of the transducer varied with the applied torque so as to require adjustment of the zero setting for each application. As described in U.S. Pat. No. 4,185,641, this problem was overcome by holding the dome and transducer together with a force determined by the tension of springs and arranging that the tension attain a given repeatable maximum value. Unfortunately, however, accidental forces occurring during handling or increases in the pressure of the fluid in the dome cavity can force the dome away from the transducer so as to permanently damage the springs by flexing them too far and/or permanently deform the membrane. In cases where the springs are obviously broken, the pressure dome can be replaced; but a more subtle and significant problem is the possibility that the springs can be weakened in a manner that is not readily noticed and thereby cause improper blood pressure readings, a zero shift, decreased temperature coefficient or dome dry-out.

BRIEF SUMMARY OF THE INVENTION

In accordance with this invention, damage to whatever type of springs are used to hold the dome and transducer housing together is prevented by provision of means limiting the amount by which the springs can be flexed.

A preferred form of the invention involves an addition to the dome structure described in the previously mentioned patent to Tykulsky, U.S. Pat. No. 4,185,641. That dome is comprised of a base having a cavity with a circular opening that is covered by a membrane, two ports communicating with the cavity so that it can be filled with fluid as described, and an annular wall of greater diameter than the circular opening. The foot of the annular wall is attached to the base so that it is concentric with the circular opening and lies on the side of the membrane that is opposite the cavity. A plurality of openings are formed in the top of the wall, and apertures extending through the wall respectively communicate with each opening. An edge of each aperture starts at its opening and slopes gradually toward the membrane so as to form a ramp and then proceeds parallel to the membrane so as to form a flat section. If a detent notch is desired, the flat section is below the end of the ramp. The material of the annular wall between this edge of the aperture and the top of the wall thus forms a long thin tongue that is joined to the annulus at one end. Mechanical stops are respectively formed at the ends of the flat sections so as to limit rotation of pins following therealong. In order to strengthen the tongues, bridges are formed that respectively extend radially outward between the free ends of the tongues and the annulus so that the tongues are rigidly supported beam springs. If such bridges are not used, the tongues are cantilever springs.

A transducer that is to be attached to the dome is provided with outwardly extending radial pins that are angularly displaced in the same manner as the openings in the top of the wall. When the pins are respectively placed in these openings and under the respective bridges, the transducer is coaxial with the annular wall and the circular opening of the cavity, and the pressure sensing surface of the transducer is in or nearly in contact with the membrane covering the circular opening. As the transducer is rotated in one direction about its axis, the pins ride up the respective ramp sections of the adjacent tongues so as to flex the tongues more and more in an axial direction away from the membrane and thus increase the force with which the pressure sensing surface pushes against the membrane. When the pins reach the top of their respective ramps and start moving along the flat sections of the tongues, the force is at its maximum value and does not increase with further rotation because the pins merely slide along the flat sections of the tongues and parallel to the membrane until they strike the stops.

In a preferred embodiment of this invention, the following additions are made to the structure just described. For each tongue, a stop means having a head and neck is molded from the material of the annular wall with its neck attached to the flat section of the tongue. The neck may serve as the mechanical stop for the pins previously referred to. Thus the stop means extends toward the membrane. An opening is formed in the material of the annular wall having a head portion surrounding the head of the stop means and a neck portion through which the neck of the stop means passes. There is a gap between the point where the head of the stop joins its neck and the point where the head portion of the opening joins its neck portion. As the tongue is bent away from the membrane, the gap gets smaller on the side toward the tongue. Ultimately, the head of the stop means bears against the neck portion of the opening so as to prevent further flexing of the tongue and consequent damage thereto. It also prevents an increase in the pressure on the fluid in the cavity from pushing the membrane so far from the cavity as to damage it. The stop means may have the shape of a "T", an "L" or a lollipop, all of which have head and neck portions.

BRIEF DESCRIPTION OF THE DRAWINGS

FIG. 4A is a top view of the pressure dome.

DETAILED DESCRIPTION OF THE INVENTION

All corresponding parts of the various figures of the drawings are designated by the same numerals or letters.

Figures 1, 1A:
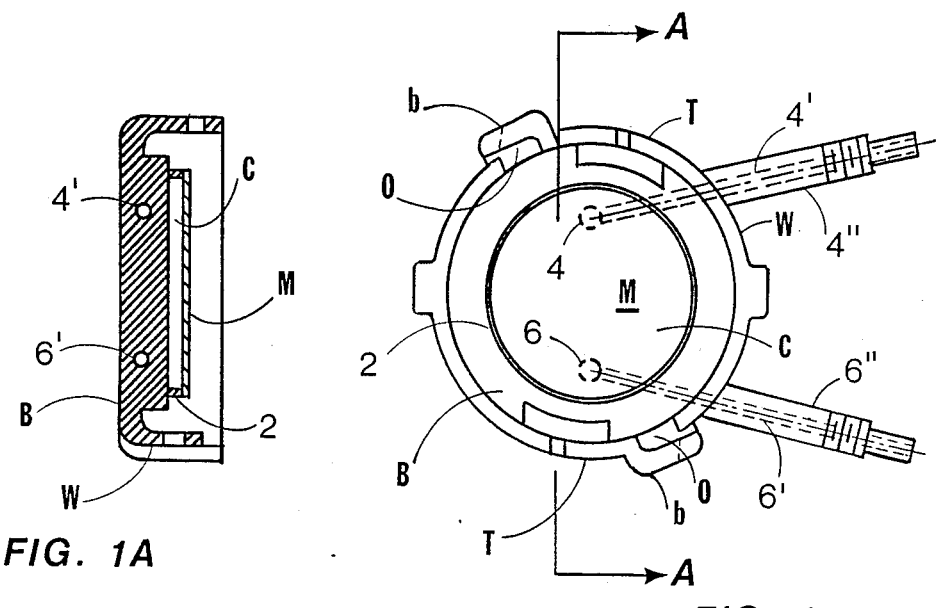
FIG. 1 is a bottom view of a pressure dome incorporating the invention showing the membrane and annular wall.
FIG. 1A is a cross-section AA of FIG. 1.
Figure 4:
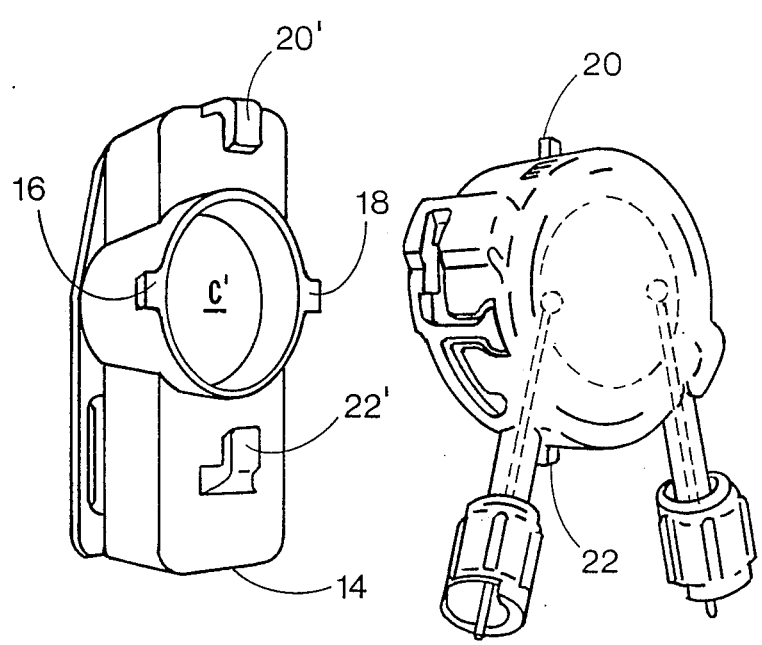
FIG. 4 is view like FIG. 3 taken from a slightly different angle.

In FIG. 1, an annular wall 2 resting on a base B forms a cavity C that is covered by a transparent membrane M. Ports 4 and 6 in the base B communicate with the cavity C and are connected to passageways 4' and 6' contained within the base B and tubes 4" and 6" that can be connected to valves, as previously described. Also shown is the top of an annular wall W that contains the tongues T. It will be noted that there are openings O in the top of the wall W between the end of each tongue T and the wall W, and that each of the diametrically opposed openings O is bridged by a bracket b so as to support the outer end of each tongue T and still permit pins on a transducer access as will be described. Some of these structures are shown more clearly in FIG. 1A which is a section AA of FIG. 1.

Figure 2:
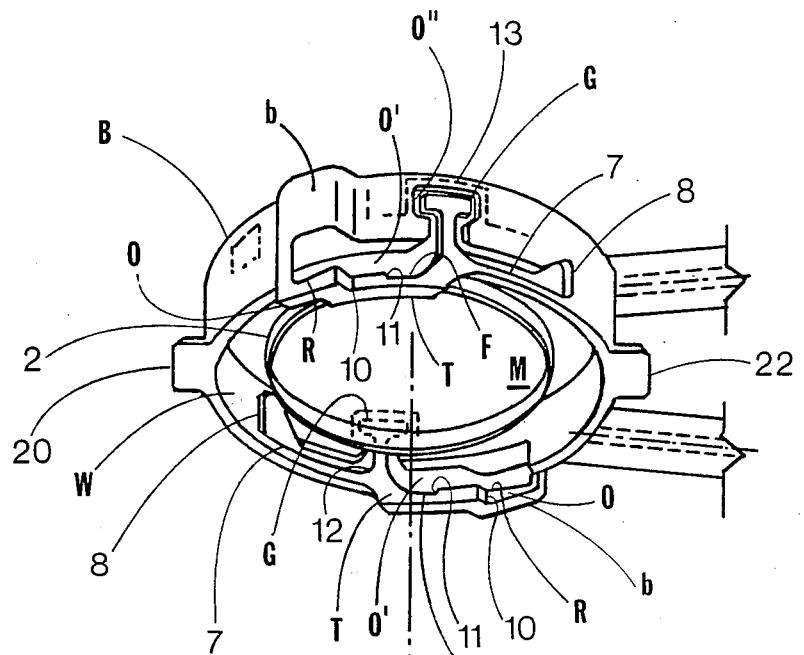
FIG. 2 is a projection view showing the bottom of a pressure dome incorporating this invention.

In the following description of FIG. 2, only one-half of the structure of the dome that is pertinent to this invention will be described in the interest of simplicity, but the other half is the same and corresponding features are designated in the same way. As can be seen, an opening O' is formed in the annular wall W. The edge of the opening O' that is farther away from the membrane M in an axial direction and the top of the wall W form between them the tongue T having an inner end at 8 and an outer end at 10. The latter would be free except for the bridge b. Note that the bridge b joins the end 10 to the wall W in such manner as to leave the opening O between the end 10 of the tongue T and the top of the wall W. The purpose of the bridge b is to strengthen the tongue T, but the tongue T acts as a beam spring. A ramp R on the tongue T that is adjacent to the opening O slopes toward the membrane M and is joined via a detent notch 11 to a flat section F that is parallel to the membrane M. A stem 12 of a T-shaped stop is joined to the tongue T at an intermediate point on the flat section F. The stop extends toward the membrane M and fits inside a T-shaped opening O" formed in the annular wall W and a portion 13 of the base B. If the annular wall W were higher, the portion 13 would not be necessary and the opening O" could lie entirely within the wall W. There is a gap G between the top of the "T" formed by the stop and the top of the "T" formed by the opening O" so that the tongue T can be flexed away from the membrane M by a reasonable amount, but when the tongue T is flexed to the limit desired, the gap that is towards the tongue is closed and no further movement can occur. The tongues T and their associated structures need not be diametrically opposed and there could be more than two.

Figure 3:
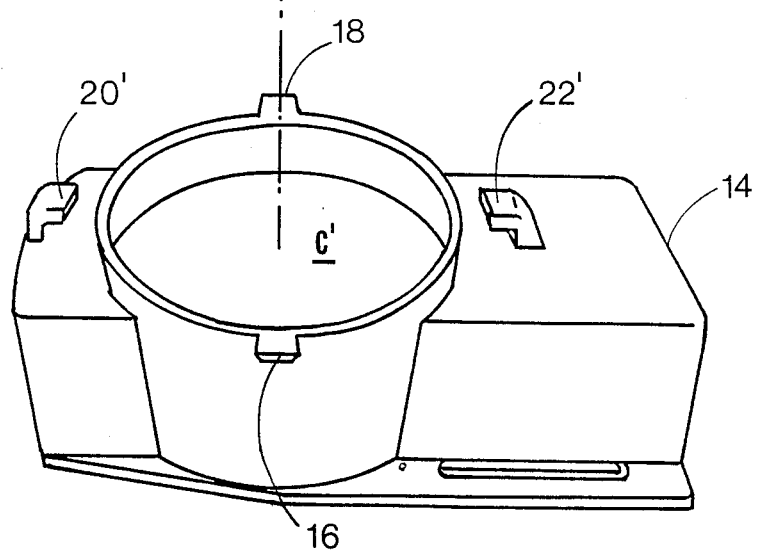
FIG. 3 is a projection view of a transducer housing oriented approximately as it would be when it is to be attached to the dome of FIG. 2.

FIG. 3 illustrates one form of a housing 14 for a transducer that is designed for coupling to the pressure dome. The pressure sensor itself is not shown but is circular and fits snugly in the cavity C' with its pressure sensing surface in the plane of the top of the cavity. The housing 14 is provided with pins 16 and 18 that extend perpendicularly from the axis of the cavity C' and are diametrically opposed so that when the axis of the cavity C' is aligned with the axis of the cavity C, the pins 16 and 18 can be respectively inserted under the bridges b into the openings 0 in the top of the annular wall W. When the housing 14 is pushed toward the membrane M, the pressure sensing surface of the transducer (not shown) will make contact with the membrane M. Rotation of the housing 14 will cause its pins 16 and 18 to ride up the respectively adjacent ramps R so as to flex the tongues T away from the membrane M and increase the force with which the pressure sensing surface of the transducer bears against the membrane M. When the pins 16 and 18 drop over the notches 11 and reach the flat sections F, further rotation does not increase the force and further rotation is prevented by the pins 16 and 18 coming into contact with the stem 12 of the T-shaped stop.

In order to prevent the dome from pivoting about an axis between the pins 16 and 18 by forces that may be accidentally applied, diametrically opposed tabs 20 and 22 are provided that extend radially outward from the top of the wall W at points that are angularly midway between the flat sections F on the tongues. As the housing 14 is axially rotated and the pins 16 and 18 are riding up the ramps R of the tongues, the tabs 20 and 22 respectively slide under L-shaped brackets 20' and 22' and will prevent the dome from being rocked about an axis between the pins 16 and 18.

What is claimed is:

1. A pressure dome comprising
    a base having means defining a cavity that has a circular opening in a plane on one side of said base,
    a membrane closing said circular opening,
    ports extending through said base that communicate with said cavity,
    a plurality of tongues depending from said one side of said base, said tongues being generally parallel to said membrane, spaced from it along the axis of said circular opening, and located at a radial distance from the axis of said circular opening that is greater than the radius of said circular opening,
    stop means for each tongue, each stop means being comprised of a neck having one end joined to a intermediate point along the tongue and a head joined to said neck, the head having a greater dimension circumferentially with respect to said axis than said neck, and the configuration of said neck and head being such that said head is axially closer to the plane of said circular opening than said tongue, and
    means joined to said base for forming at least one surface that is spaced from said head and between said head and said tongue so that movement of said tongue by a given amount in a direction away from said membrane causes said head to bear against said surface and thus limit the movement of said tongue.

2. A pressure dome as set forth in claim 1 wherein said means forming at least one surface lies within an annulus that is coaxial with said circular opening and forms an opening having head and neck portions that are respectively spaced from said head and neck of said stop means.

3. A pressure dome as set forth in claim 2 wherein the head and neck of said stop means and said tongue lie within said annulus.

4. A pressure dome comprising
a base having means defining a cavity that has a circular opening on one side of said base,
a membrane closing said circular opening,
ports extending through said base that communicate with said cavity,
a plurality of tongues depending from said one side of said base, said tongues being generally parallel to said membrane, spaced from it along the axis of said circular opening, and located at a radial distance from the axis of said circular opening that is greater than the radius of said circular opening,
stop means for each tongue, each stop means being comprised of a neck having one end joined to an intermediate point along the tongue and a head joined to said neck, the head having a greater dimension circumferentially with respect to said axis than said neck, and the configuration of said neck and head being such that said head is axially closer to the plane of said circular opening than said tongue, and
means joined to said base forming an opening having a head portion surrounding and circumferentially spaced from the head of said stop means and a neck portion circumferentially spaced from and surrounding at least a portion of the neck of said stop means, the means forming said opening being free of material at a greater radial distance from said axis than any part of said tongue, whereby movement of said tongue by a given amount in an axial direction away from said membrane causes the head of said stop means to bear against the part of said head portion of said opening that is nearer to said tongue and thus limit the movement of said tongue.

* * * * *